United States Patent
Carnevale et al.

(10) Patent No.: US 7,975,064 B2
(45) Date of Patent: Jul. 5, 2011

(54) ENVELOPE PACKET ARCHITECTURE FOR BROADBAND ENGINE

(75) Inventors: Michael Joseph Carnevale, Rochester, MN (US); Scott Douglas Clark, Rochester, MN (US); David Wayne Hill, Rochester, MN (US); Charles Ray Johns, Austin, TX (US); Thomas K. Pokrandt, Pine Island, MN (US); Jeffrey Joseph Ruedinger, Rochester, MN (US); Dorothy Marie Thelen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1951 days.

(21) Appl. No.: 10/942,422

(22) Filed: Sep. 16, 2004

(65) Prior Publication Data

US 2006/0059273 A1    Mar. 16, 2006

(51) Int. Cl.
G06F 15/16    (2006.01)
(52) U.S. Cl. ........ 709/232; 709/234; 709/236; 709/237; 370/223; 370/229; 370/235
(58) Field of Classification Search .................. 709/232, 709/234, 236, 237
See application file for complete search history.

(56) References Cited

U.S. PATENT DOCUMENTS

| | | | | |
|---|---|---|---|---|
| 4,449,182 A | * | 5/1984 | Rubinson et al. | 710/60 |
| 5,278,834 A | * | 1/1994 | Mazzola | 370/469 |
| 6,034,962 A | * | 3/2000 | Ohno et al. | 370/399 |
| 6,175,560 B1 | * | 1/2001 | Bhagalia et al. | 370/342 |
| 6,185,197 B1 | * | 2/2001 | Cheung Yeung et al. | 370/328 |
| 6,338,131 B1 | * | 1/2002 | Dillon | 712/201 |
| 6,490,251 B2 | * | 12/2002 | Yin et al. | 370/236.1 |
| 6,622,182 B1 | * | 9/2003 | Miller et al. | 710/29 |
| 7,099,273 B2 | * | 8/2006 | Ha et al. | 370/229 |
| 7,218,608 B1 | * | 5/2007 | Fang et al. | 370/229 |
| 7,337,233 B2 | * | 2/2008 | Dillon | 709/232 |
| 7,385,923 B2 | * | 6/2008 | Baratakke et al. | 370/235 |
| 7,397,765 B2 | * | 7/2008 | Aimoto et al. | 370/252 |
| 7,447,794 B1 | * | 11/2008 | Miller et al. | 709/232 |
| 7,453,878 B1 | * | 11/2008 | Martin et al. | 370/394 |
| 7,712,006 B1 | * | 5/2010 | Miller | 714/753 |
| 7,787,367 B2 | * | 8/2010 | Gusat et al. | 370/229 |
| 7,855,954 B2 | * | 12/2010 | Willenborg et al. | 370/229 |

(Continued)

FOREIGN PATENT DOCUMENTS

JP    2044936 A    2/1990

(Continued)

*Primary Examiner* — John Follansbee
*Assistant Examiner* — Backhean Tiv
(74) *Attorney, Agent, or Firm* — Stephen R. Tkacs; Stephen J. Walder, Jr.; Matthew B. Talpis (57) ABSTRACT

A mechanism provides for sending an envelope and replying to an envelope. A transmitter is configured to send an envelope. A receiver is coupled to the transmitter, wherein the receiver is configured to receive the envelope and generate a reply envelope. A send buffer is coupled to the transmitter. A receive buffer is coupled to the receiver. A retry timer is coupled to the transmitter, wherein the retry timer is configured to reset upon the receipt of a reply envelope correlated to the transmit envelope. The transmitter is configured to retransmit an envelope if the transmitter does not receive a corresponding reply envelope within a selected time period as determined by the retry timer. This leads to a decrease in the total number of envelopes, transmitted from both the transmitter and the receiver.

13 Claims, 10 Drawing Sheets

U.S. PATENT DOCUMENTS

| | | | |
|---|---|---|---|
| 7,873,741 B2* | 1/2011 | Miller et al. | 709/232 |
| 2002/0133620 A1* | 9/2002 | Krause | 709/238 |
| 2002/0150048 A1* | 10/2002 | Ha et al. | 370/231 |
| 2002/0154602 A1* | 10/2002 | Garcia-Luna-Aceves et al. | 370/230 |
| 2002/0188648 A1* | 12/2002 | Aweya et al. | 709/102 |
| 2003/0002442 A1* | 1/2003 | Flammer et al. | 370/230 |
| 2003/0123394 A1* | 7/2003 | Neale et al. | 370/235 |
| 2003/0123481 A1* | 7/2003 | Neale et al. | 370/466 |
| 2003/0179752 A1 | 9/2003 | Grass | |
| 2003/0212793 A1* | 11/2003 | Kumar | 709/226 |
| 2004/0062245 A1* | 4/2004 | Sharp et al. | 370/392 |
| 2004/0184444 A1* | 9/2004 | Aimoto et al. | 370/352 |
| 2005/0025090 A1* | 2/2005 | Klein et al. | 370/328 |
| 2005/0036511 A1* | 2/2005 | Baratakke et al. | 370/469 |
| 2005/0058149 A1* | 3/2005 | Howe | 370/428 |
| 2005/0180327 A1* | 8/2005 | Banerjee et al. | 370/236 |
| 2005/0195849 A1* | 9/2005 | Rajkotia et al. | 370/428 |
| 2005/0226239 A1* | 10/2005 | Nishida et al. | 370/389 |
| 2005/0286447 A1* | 12/2005 | Coffman | 370/278 |
| 2006/0015660 A1* | 1/2006 | Nguyen et al. | 710/52 |
| 2006/0059273 A1* | 3/2006 | Carnevale et al. | 709/250 |
| 2006/0098604 A1* | 5/2006 | Flammer et al. | 370/337 |
| 2006/0262718 A1* | 11/2006 | Li et al. | 370/229 |
| 2007/0130246 A1* | 6/2007 | Lau et al. | 709/200 |
| 2008/0186863 A1* | 8/2008 | Baratakke et al. | 370/237 |
| 2009/0070480 A1* | 3/2009 | Miller et al. | 709/232 |
| 2009/0225677 A1* | 9/2009 | Williams | 370/253 |

FOREIGN PATENT DOCUMENTS

| | | |
|---|---|---|
| JP | 5110542 A | 4/1993 |
| JP | 7297810 A | 11/1995 |
| JP | 8032624 A | 2/1996 |
| JP | 2004139565 A | 5/2004 |
| JP | 2004246691 A | 9/2004 |

* cited by examiner

| BITS | CODE | DESCRIPTION |
|---|---|---|
| PHYSICAL LAYER | GROUP 0 OF ENVELOPE | |
| 0:2 | ESN_1 | ENVELOPE SEQUENCE NUMBER. ESN(1:3) |
| 3 | ESI_0 | ENVELOPE START IDENTIFIER BIT. |
| 4:6 | ESN_2 | ENVELOPE SEQUENCE NUMBER. ESN(4:6) |
| 7 | ESI_1 | ENVELOPE START IDENTIFIER BIT. |
| 8 | ESI_2 | ENVELOPE START IDENTIFIER BIT. |
| 9:11 | PLG_TYPE_0 | PLG TYPE FIELD.<br>000     NULL PLG<br>001     COMMAND<br>010     DATA TYPE B<br>011     DATA TYPE A<br>100-110 RESERVED<br>111     RESERVED FOR CUSTOMER USE. |
| 12:143 | PLG_0 | PLG DATA. TYPE FIELD INDICATES THE DATA CONTENTS |
| PHYSICAL LAYER | GROUP 1 OF ENVELOPE | |
| 0 | ESN_0 | ENVELOPE SEQUENCE NUMBER. ESN(0) |
| 1:7 | RESN | RETURNED ENVELOPE SEQUENCE NUMBER. ESN(0:6) |
| 8 | RESN_VALID | RETURNED ENVELOPE SEQUENCE NUMBER VALID.<br>0     RESN NOT VALID<br>1     RESN VALID |
| 9:11 | PLG_TYPE_1 | PLG TYPE FIELD.<br>000     NULL PLG<br>001     COMMAND<br>010     DATA TYPE B<br>011     DATA TYPE A<br>100-110 RESERVED<br>111     RESERVED FOR CUSTOMER USE. |
| 12:143 | PLG_1 | PLG DATA. TYPE FIELD INDICATES THE DATA CONTENTS |

*FIG. 3A*

| BITS | CODE | DESCRIPTION |
|---|---|---|
| PHYSICAL LAYER | GROUP 2 OF ENVELOPE | |
| 0 | RESERVED | RESERVED (SET TO '0'.) |
| 1:8 | CRC_0 | ENVELOPE CRC. CRC(0:7) |
| 9:11 | PLG_TYPE_2 | PLG TYPE FIELD.<br>000     NULL PLG<br>001     COMMAND<br>010     DATA TYPE B<br>011     DATA TYPE A<br>100-110 RESERVED<br>111     RESERVED FOR CUSTOMER USE. |
| 12:143 | PLG_2 | PLG DATA. TYPE FIELD INDICATES THE DATA CONTENTS |
| PHYSICAL LAYER | GROUP 3 OF ENVELOPE | |
| 0 | ENV_RETRY | ENVELOPE RETRY.<br>0    ENVELOPE RECEIVED, NO RETRY NECESSARY.<br>1    ENVELOPE RETRY REQUESTED DUE TO BUFFER FULL CONDITION |
| 1:8 | CRC_0 | ENVELOPE CRC. CRC(0:7) |
| 9:11 | PLG_TYPE_2 | PLG TYPE FIELD.<br>000     NULL PLG<br>001     COMMAND<br>010     DATA TYPE B<br>011     DATA TYPE A<br>100-110 RESERVED<br>111     RESERVED FOR CUSTOMER USE. |
| 12:143 | PLG_2 | PLG DATA. TYPE FIELD INDICATES THE DATA CONTENTS |

*FIG. 3B*

| BITS | CODE | DESCRIPTION |
|---|---|---|
| COMMAND CREDIT FIELDS | | |
| 0:3 | CCREDIT | NUMBER OF CREDITS FOR COMMANDS AND REFLECTED COMMANDS. THE CCREDIT VALUE IS A POSITIVE BINARY NUMBER IN THE RANGE OF 0 TO 15 CREDITS. |
| 4:7 | RESERVED | RESERVED. (SET TO ZEROS.) |
| SNOOP RESPONSE FIELDS | | |
| 8 | SVALID | VALID SNOOP IDENTIFIER.<br>0    PACKET DOES NOT CONTAIN A VALID SNOOP RESPONSE<br>1    PACKET CONTAINS A VALID SNOOP RESPONSE |
| 9 | RESERVED | RESERVED. (SET TO ZEROS.) |
| 10:17 | SNOOP RESP | SNOOP RESPONSE |
| 18:31 | ATAG | ACKNOWLEDGE TRANSFER TAG |
| 32:33 | RESERVED | RESERVED. (SET TO ZEROS.) |
| COMMAND FIELDS | | |
| 34 | CVALID | VALID COMMAND IDENTIFIER (NOTE: DOES NOT APPLY TO SNOOP RESPONSE OR CREDIT FIELDS).<br>0    PACKET DOES NOT CONTAIN A VALID COMMAND.<br>1    PACKET CONTAINS A VALID COMMAND. |
| 35:48 | TTAG | COMMAND TRANSFER TAG |
| 49:50 | RESV | RESERVED. (SET TO '0'.) |
| 51:55 | TTYPE | TRANSFER TYPE |
| 56:60 | TSIZE | TRANSFER SIZE |
| 61:66 | AM | ADDRESS MODIFER |
| 67:69 | RESV | RESERVED. (SET TO '0'.) |
| 70:131 | ADDR | ADDRESS. |

*FIG. 4*

| BITS | CODE | DESCRIPTION |
|---|---|---|
| HEADER PHYSICAL LAYER GROUP | | |
| 0:13 | DTAG | DATA TAG. |
| 14:21 | DCREDIT | DATA BUFFER CREDIT. THE DCREDIT VALUE CONTAINS ONE BIT PER CACHE BLOCK (128-BYTE BLOCK). |
| 22:29 | DSIZE | DATA TRANSFER SIZE (SINGLE BIT PER QUADWORD). A DSIZE VALUE OF ZERO CAN BE USED TO TRANSFER CREDITS WITHOUT ANY DATA IN THE PLG. |
| 30:131 | RESERVED | RESERVED. (SET TO '0'.) |
| DATA PHYSICAL LAYER GROUP | | |
| 0 | DERR | FORWARDING DATA ERROR |
| 1:2 | RESERVED | RESERVED. (SET TO '0'.) |
| 3 | RESERVED | RESERVED. (SET TO '0'.) |
| 4:131 | DATAX | DATA. QUADWORD X WHERE 'X' IS DEFINED AS THE BIT POSITION IF A '1' IN THE QUADWORD MASK. THE QUADWORD MASK IS PROCESSED FROM THE MOST SIGNIFICANT BIT (MSB) TO THE LEAST SIGNIFICANT BIT (LSB) - (BIG ENDIAN NOTATION). |

*FIG. 5A*

| BITS | CODE | DESCRIPTION |
| --- | --- | --- |
| PHYSICAL LAYER GROUP 0 | | |
| 0:1 | DTAG_0 | DATA TAG. DTAG(0:1) |
| 2 | DCREDIT_0 | DCREDIT(0). DATA BUFFER CREDIT FOR ONE CACHE BLOCK (128-BYTE BLOCK). |
| 3 | RESERVED | RESERVED. (SET TO '0'.) |
| 4:131 | DATA0 | DATA. QUADWORD 0. |
| PHYSICAL LAYER GROUP 1 | | |
| 0:1 | DTAG_1 | DATA TAG. DTAG(2:3) |
| 2 | DCREDIT_1 | DCREDIT(1). DATA BUFFER CREDIT FOR ONE CACHE BLOCK (128-BYTE BLOCK). |
| 3 | RESERVED | RESERVED. (SET TO '0'.) |
| 4:131 | DATA1 | DATA. QUADWORD 1. |
| PHYSICAL LAYER GROUP 2 | | |
| 0:1 | DTAG_2 | DATA TAG. DTAG(4:5) |
| 2 | DCREDIT_2 | DCREDIT(2). DATA BUFFER CREDIT FOR ONE CACHE BLOCK (128-BYTE BLOCK). |
| 3 | RESERVED | RESERVED. (SET TO '0'.) |
| 4:131 | DATA2 | DATA. QUADWORD 2. |
| PHYSICAL LAYER GROUP 3 | | |
| 0:1 | DTAG_3 | DATA TAG. DTAG(6:7) |
| 2 | DCREDIT_3 | DCREDIT(3). DATA BUFFER CREDIT FOR ONE CACHE BLOCK (128-BYTE BLOCK). |
| 3 | RESERVED | RESERVED. (SET TO '0'.) |
| 4:131 | DATA3 | DATA. QUADWORD 3. |

*FIG. 5B1*

| PHYSICAL LAYER GROUP 4 | | |
|---|---|---|
| 0:1 | DTAG_4 | DATA TAG. DTAG(8:9) |
| 2 | DCREDIT_4 | DCREDIT(4). DATA BUFFER CREDIT FOR ONE CACHE BLOCK (128-BYTE BLOCK). |
| 3 | RESERVED | RESERVED. (SET TO '0'.) |
| 4:131 | DATA4 | DATA. QUADWORD 4. |
| PHYSICAL LAYER GROUP 5 | | |
| 0:1 | DTAG_5 | DATA TAG. DTAG(10:11) |
| 2 | DCREDIT_5 | DCREDIT(5). DATA BUFFER CREDIT FOR ONE CACHE BLOCK (128-BYTE BLOCK). |
| 3 | RESERVED | RESERVED. (SET TO '0'.) |
| 4:131 | DATA5 | DATA. QUADWORD 5. |
| PHYSICAL LAYER GROUP 6 | | |
| 0:1 | DTAG_6 | DATA TAG. DTAG(12:13) |
| 2 | DCREDIT_6 | DCREDIT(6). DATA BUFFER CREDIT FOR ONE CACHE BLOCK (128-BYTE BLOCK). |
| 3 | RESERVED | RESERVED. (SET TO '0'.) |
| 4:131 | DATA6 | DATA. QUADWORD 6. |
| PHYSICAL LAYER GROUP 7 | | |
| 0 | DERR | FORWARDING DATA ERROR. |
| 1 | RESERVED | RESERVED. (SET TO '0'.) |
| 2 | DCREDIT_7 | DCREDIT(7). DATA BUFFER CREDIT FOR ONE CACHE BLOCK (128-BYTE BLOCK). |
| 3 | RESERVED | RESERVED. (SET TO '0'.) |
| 4:131 | DATA7 | DATA. QUADWORD 7. |

ENVELOPE PACKET ARCHITECTURE FOR BROADBAND ENGINE

TECHNICAL FIELD

The present invention relates generally to envelope delivery and, more particularly, to reducing the number of envelope resends.

BACKGROUND

In many networking technologies, various forms of packet receipt verification and recovery systems are used. Some networking technologies should have very high bandwidth and low latency, such as is found in graphical systems, such as computer gaming. One such networking protocol is Infiniband®.

However, there can be disadvantages associated with conventional networking protocols. For instance, a high degree of overhead could be used, which would decrease bandwidth, as more and more of the data stream is proportionately dedicated to overhead. Furthermore, latency could be unacceptably high, as the amount of time spent retrying the transmission of data increases. Furthermore, error correction algorithms, such as Error Correcting Codes (ECC) can require too much information to be transmitted in the header or added or appended to the main body of the data or command.

Therefore, there is a need to convey information in a manner that addresses at least some of the concerns of conventional means of conveying data.

SUMMARY OF THE INVENTION

In one illustrative embodiment, a method is provided for sending envelopes. The method comprises generating a given envelope. The given envelope has a given envelope sequence number that is after a last valid reply envelope sequence number. The method further comprises sending the given envelope to a receiver and copying the given envelope to a retry buffer. The method further comprises sending at least one subsequent envelope to the receiver, wherein each of the at least one subsequent envelope has a sequentially increasing envelope sequence number and copying the at least one subsequent envelope to the retry buffer. The method comprises receiving a reply envelope from the receiver. The reply envelope has a current reply envelope sequence number. The current reply envelope sequence number corresponds to a last envelope successfully and sequentially received at the receiver. The current reply envelope sequence number is after the last valid reply envelope sequence number. The given envelope sequence number is between the last valid reply envelope sequence number and the current reply envelope sequence number. The reply envelope comprises one or more physical layer groups. Each of the one or more physical layer groups is a distinct information packet meeting certain predefined criteria. A given physical layer group, within the one or more physical layer groups, comprises a credits value. The method further comprises incrementing a local credits count based on the credits value. Responsive to the reply envelope being received before expiration of a retry envelope sequence number timer and a reply envelope sequence number valid bit for the reply envelope being set and the current reply envelope sequence number being sequentially later than the last valid reply envelope sequence number, the method comprises deleting each envelope having an envelope sequence number up to and including the current reply envelope sequence number, including the given envelope, from the retry buffer.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

For a more complete understanding of the present invention, and the advantages thereof, reference is now made to the following Detailed Description taken in conjunction with the accompanying drawings, in which:

FIGS. 5B1 and 5B2 illustrates one form of a "B" type data group;

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

In the remainder of this description, a processing unit (PU) may be a sole processor of computations in a device. In such a situation, the PU is typically referred to as an MPU (main processing unit). The processing unit may also be one of many processing units that share the computational load according to some methodology or algorithm developed for a given computational device. For the remainder of this description, all references to processors shall use the term MPU whether the MPU is the sole computational element in the device or whether the MPU is sharing the computational element with other MPUs, unless otherwise indicated.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
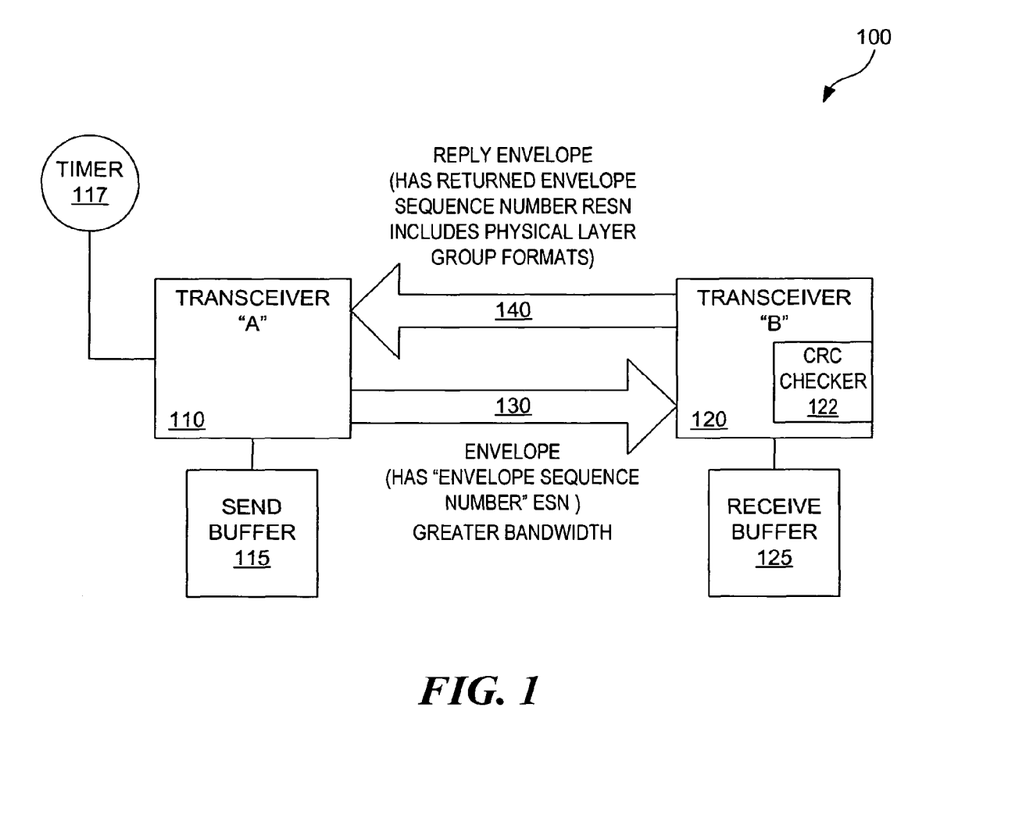
FIG. 1 schematically depicts a system in which envelopes are transferred from a transmitter to a receiver.

Turning now to FIG. 1, disclosed is an envelope generation and reception system 100. Generally, the present system 100 decreases the amount of overhead in a data conveyance by decreases on the number of acknowledgements generated. A receiver, such as transceiver B 120, only acknowledges a packet "envelope" when it is properly received by the receiver 120. Generally, an envelope is a packet of information usually containing commands, data, and protocol controls (such as sequence numbers, dataflow credits, and so on). Generally, the term envelope is used to refer to an "envelope packet", which is typically a collection of information grouped into a known packet size, encapsulated by an error detection mechanism, and associated with a means of guaranteeing delivery between two devices. A CRC is also embedded in the envelope information for ensuring correct delivery of the information over a network.

If there is an error condition that arises outside of the receiver 120, no acknowledgment is generated by the receiver. Instead, the receiver simply pauses and does not process any further data. The sender, meanwhile, is awaiting a confirmation of a successful reception of an envelope. If no confirmation is forthcoming after a given time-period, the first envelope that has not been acknowledged is resent. The acknowledgement can itself contain a further envelope of information.

In the system 100, a transceiver A 110 is coupled to a transceiver B 120 over a high speed link 130 at tens of GigaBytes/sec. The transceiver A 110 generates "envelopes" to transmit to the transceiver B 120. In the system 100, each envelope comprises four physical layer groups (PLGs). Generally, a PLG can be defined as a distinct information packet meeting certain predefined criteria, as will be described below. However, other embodiments of envelopes can have other numbers of PLGs or other information. A plurality of PLGs are appended to one another to create an "envelope".

Each envelope has within it, an "Envelope Sequence Number" (ESN). An ESN can be generally defined as a sequential number assigned to an envelope when it is initially transmitted from the transmitter A 110. The first envelope could have an ESN of 0, a second envelope an ESN of 1, and so on. Also, as each envelope is sent out from the transceiver A 110, a copy of that envelope including the ESN is stored in a send buffer 115.

Then, the packet is typically conveyed over the data link 130 to the transceiver B 120, and the packet is placed within a receive buffer 125. The transceiver B then performs a CRC check upon the data by a CRC checker 122. If the envelope passes the CRC check, the transceiver B then checks the ESN field in the envelope, and if it matches the next sequential ESN from the last envelope received successfully, the packet is kept in the receive buffer 125. Otherwise it is discarded and the receiver returns to the previous state as if it never arrived. If both checks are successful, a "reply envelope" is sent that acknowledges receipt of the envelope by returning the ESN from the received envelope to the sender. For instance, if an envelope with an ESN of 3 is validated by the CRC and ESN check, the transceiver B 120 would send an envelope with a Return ESN (RESN) number of 3 back to the transceiver A to denote that the envelope was successfully received. The reply envelope can itself also have other information to be transmitted to the transceiver A 110, which itself needs to be acknowledged.

In some embodiments, the envelope has other information that the transceiver B 120 is to transmit to transceiver A. Therefore, at least one of the four PLGs will be of a data type, an instruction type, or so on. However, in the event that the transceiver B 120 has no information to send to the transceiver A 110 other than the fact that the envelope passed the CRC and ESN check, a null envelope having the RESN and a RESN bit showing the RESN value is valid, but nothing else is in the packet.

In a further embodiment, the transceiver B 120 coalesces the RESNs in return envelopes. This occurs as follows. Due to implementation variations, such as a smaller return bandwidth 140 compared to send bandwidth 130, the path 140 may not be able to support an RESN envelope for each envelope. Therefore, a return envelope containing a new RESN may not be sent until several envelopes have been received. To allow for this condition, transceiver B 120 will always return the ESN of the last envelope properly received (i.e., it had good CRC, was the next sequential ESN, and receive buffer space was available).

If it so happens that several envelopes have been received by transceiver B 120 before it can form a return envelope, the RESN sent back and received by transceiver A 110 will not be a sequential increment from the last RESN seen by trans. A 110. Rather it will appear to have skipped acknowledging several envelopes from transceiver A 110 to transfer to transceiver B 120. In this case, transceiver A 110 will treat the received RESN as acknowledging all sent envelopes from the previous RESN received up to and including the newly received RESN. For example, transceiver A 110 may successfully send envelopes with ESN 3, 4, 5, and 6 while transceiver B 120 is forming a return envelope if the bandwidth of link 130 is four times greater than the bandwidth of link 140. Transceiver B 120 will return RESN=6, even though it will have last returned RESN=2 sometime prior. Transceiver A 110 will consider envelopes with ESN 3, 4, 5, and 6 as properly sent when it sees RESN=6, even though it did not explicitly receive RESNs 3, 4, and 5. This mechanism is known as "coalescing".

When the transceiver A 110 sends an envelope, a copy of that envelope is placed in the send buffer 115. The transceiver A 110 then sends the next envelope, and places that next envelope in the send buffer 115. Each envelope has its own identifying sequential ESN. In any event, the transceiver A 110 employs a timer 117 to determine whether it has received the corresponding RESN for a given packet within a certain time period. If the transceiver A 110 received the corresponding RESN to the transmitted ESN within a given time period, the envelope is deemed received by transceiver B 120, and the duplicate of that envelope is deleted from the send buffer. However, if the corresponding RESN is not received within a given time period, then the transceiver A 110 retransmits the envelope that was not acknowledged by the transceiver B 120, and then retransmits all the envelopes after this envelope within the send buffer 115.

An advantage of this approach is that the amount of acknowledgements that are sent between transceiver A 110 and transceiver B 120 are minimized, as only acknowledgements of successful conveyances are generated. In the system 100, if a null envelope is generated, it will not be acknowledged with a still further envelope. Only envelopes that contain at least one PLG that is a non-null will have their own RESN. For example, an envelope that is sent from transceiver B 120 to transceiver A 110 that carries an RESN along with at least one non-null PLG is simultaneously a new envelope that has its own ESN referenced to transceiver B 120 acting as a transmitter to transceiver A 110 acting as a receiver.

Typically, in the system 100, envelope sequence numbers (ESNs) are assigned to new non-null envelopes in ascending order through the entire ESN range (0 to 127), except that ESNs typically wrap back to zero after the maximum value of 127 is used. The ESN for a null envelope should be zero or the value of the last ESN sent as null envelopes are not saved for re-transmission.

In one embodiment, the transceiver A 110 does not send a new envelope, with an ESN value that is more than 64 envelopes away from the first envelope in the send buffer. This is to avoid confusion at the receiver to distinguish ESNs that are a continuation of a sequence after an error occurs versus the beginning of a retransmission after a time out. Thus, a new envelope with ESN of value "C" can only be transmitted if one of the following is true (the following expressions do not use modulo arithmetic) [This is only true for ESNs and RESNs ranging from 0-127]:

C>last RESN and C<(last RESN+65) or
C<last RESN and C<(last RESN−63) [wrap condition]

As envelopes are transmitted, each non-null envelope, excluding the RESN, RESN_valid, cyclic redundancy check (CRC), and ENV_Retry bit are placed into a FIFO envelope retry buffer, such as the send buffer 115, for retransmission in case of an error. The envelope start identifier bits and the reserved bit in the envelope can optionally be placed in the envelope retry buffer.

For error detection, programmable RESN timer 117 can be started when a non-null envelope is transmitted by the transceiver A 110 and the timer is not already running. Whenever the RESN timer 117 is restarted, it is first reloaded with its initial embodiment-dependent value. The method and range of the timing value is embodiment-dependent, but should be large enough to cover the maximum round trip time of the link, from ESN to RESN.

An RESN is defined as a sequentially valid RESN when the RESN valid bit is set, the RESN value is sequentially later than the last sequentially valid RESN received, and the envelope containing the RESN has a correct CRC. When a sequentially valid RESN is received by the transceiver A 110, the RESN timer 117 is reset, and the envelopes up to and including the envelope with an ESN equal to the received RESN value are considered acknowledged and are removed from the envelope retry buffer, such as the send buffer 115. This process can be referred to as Retire. If any envelopes remain in the envelope retry buffer, the RESN timer 117 is restarted. Otherwise, the RESN timer is stopped until a new non-null envelope is transmitted. In the system 100, if the ENV_Retry bit is equal to 1, the retry sequence, below also applies.

If the RESN timer 117 expires and the transceiver A 110 is not in the Retry_Full sequence, the transceiver A 110 completes the transmission of the current envelope. This is done to avoid having so many erroneous bits for a partially transmitted envelope that the CRC check may not detect an error. The transceiver A 110 increments the retry counters. If a retry counter exceeds an embodiment-dependent threshold, the link is stopped and software or firmware is notified. The notification method is embodiment dependent. In a further embodiment, the link can be restarted. If successful, normal operation can continue. The retry counter can be periodically reset by software to give an error rate, (that is, the number of errors over time)

If the retry counter does not exceed the threshold, the transceiver proceeds with the following. The transceiver A 110 clears the network by sending a minimum of 72 idle characters. The value of 72 idle characters is dependent on a particular embodiment where the size of the envelope is a fixed 72 bytes. What is required is that the number of idle characters sent is greater than or equal to the largest envelope that can be transmitted. A total of at least 72 idle characters are sent, not 72 idles per physical link. When an idle is sent on any 8-bit physical link, idles should also be simultaneously sent on any other 8-bit physical link used for the same data link. Idles the size of an envelope are sent before resending the first envelope to flush any reordering logic in the receiver if the envelope (4 cycles×18 bytes) is sent across a narrower physical link spread over more cycles (i.e., 24 cycles×3 bytes). Bit errors may have caused the reordering logic to falsely detect the start of an envelope, so a stream of idles as big or bigger than an envelope is used to flush any malformed envelopes out of the receiver logic so it can properly detect the start of the first retransmitted envelope. The transceiver A 110 starts retransmitting envelopes in the envelope retry buffer 115 in the same order as sent previously, and the RESN timer 117 is restarted. This process is referred to as Retry.

During a Retry or Retry_Full sequence, if a sequentially valid RESN is received while sending idle characters due to a retry condition, the transceiver A 110 could stop sending idles and start sending new envelopes as if the retry did not occur. If a sequentially valid RESN is received by the transceiver A 110 while retransmitting envelopes during a retry condition, the transceiver A 110 will remove the corresponding envelopes, and continue retransmitting any remaining envelopes in the envelope retry buffer, such as the send buffer 115.

There are two options if an RESN is received while transceiver A 110 is retransmitting envelopes. Transceiver A 110 can continue to retransmit all envelopes in the send buffer, or can, upon completion of transmitting the current envelope, proceed to the envelope sequentially following the received RESN. Subsequent new envelopes will also be sent if there is space in the envelope retry buffer 115 for these envelopes. The rule regarding error detection still applies; programmable RESN timer 117 is started when a non-null envelope is transmitted.

If the transceiver sees the ENV_Retry bit on it means the receiver dropped an envelope because it had no place to put the PLG payload, in contrast to seeing a bit error during transmission. Distinguishing this cause from a corrupted envelope can lower the retry latency as the link idles that precede a retry transmission can be skipped. When the transceiver receives an envelope with a correct CRC and with the ENV_Retry bit equal to 1, it will enter what is called the Retry_Full sequence. The transceiver A 110 will complete the transmission of the current envelope. It is embodiment-dependent whether the transceiver A 110 then waits for the RESN timer 117 to expire, or stops the RESN timer at the start of the Retry_Full sequence. It is also embodiment-dependent whether the transceiver A 110 then clears the network by sending at least 72 idle characters. The transceiver A 110 then begins retransmission starting at the envelope that has the next ESN in the sequence after the value that was received in the RESN field of the envelope that had the Retry indication set. A retry counter will not be incremented as a result of this retransmission since a physical link error did not occur.

After the last envelope in the envelope retry buffer 115 has been re-transmitted, the RESN timer 117 is reloaded and restarted if it were stopped. If the RESN is a sequentially valid RESN, and when a sequentially valid RESN is received, the RESN timer 117 is reset, and the envelopes up to and including the envelope with an ESN equal to the received RESN value are considered acknowledged and are removed from the retry/send buffer 115.

While in the Retry_Full sequence, reception of an envelope with a sequentially valid RESN could cause another retransmission, or could prevent some envelope that was in the envelope retry buffer 115 at the beginning of the Retry_Full sequence from being retransmitted. This could happen if, while in the Retry_Full sequence, reception of an envelope with a correct CRC and the ENV_Retry bit equal to '1' will cause the Retry_Full sequence to restart.

Immediately after being initialized, the transceiver B 120, acting as a receiver, has the RESN valid bit set to '0' in envelopes it sends until it receives a non-null envelope with a correct CRC and with an ESN equal to zero. The following rules only apply after such an envelope is received.

The transceiver B 120, acting as a receiver, tracks a value called the "last good ESN", which corresponds to the last good, non-null envelope received when there was room for the envelope in the receive buffer 125. Other than a null envelope, the expected ESN of the next envelope is equal to (((last good ESN)+1) modulo 128). The transceiver B 120 checks the CRC for each envelope received.

If the envelope CRC is incorrect, the following applies: The envelope is discarded. No RESN is returned to the transmitter for this envelope. The last good ESN is unchanged.

If a received envelope has a correct CRC and is a null envelope, the following applies: The envelope is considered good, but the envelope is discarded, except that the RESN field, RESN_valid bit, and ENV_Retry bit are treated normally as defined in the transmit rules. No RESN is returned to the transmitter 110 for this envelope. Finally, the last good ESN is unchanged.

If a received envelope has a correct CRC and the expected ESN, and the envelope is not a null envelope, but the receiver 120 cannot process all of the payload within the envelope because the receive buffer 125 is full, the following applies: The envelope is discarded, except that the RESN field, RESN_valid bit, and ENV_Retry bit are treated normally as defined in the transmit rules; The ENV_Retry bit in PLG 3 is set to '1' in the next outgoing envelope to the transmitter 110 and the RESN placed in that envelope has the value of the last good ESN. If there is no outgoing envelope, a null envelope is used to return the last good ESN and ENV_Retry bit. This is the only event for which the ENV_Retry bit is set to '1'. In other words, the ENV_Retry bit does not get set to '1' in other envelopes where the ESN does not match the expected ESN when the receive buffer is full. Finally, the last good ESN is unchanged.

If both the CRC and ESN are correct, the envelope is not a null envelope, and there is room in the receive buffer 125 to receive the data, the following applies: The envelope is considered good and the contents of the envelope are forwarded to its transport layer. Finally, the last good ESN is incremented (and wraps to zero from 127).

Figure 2:
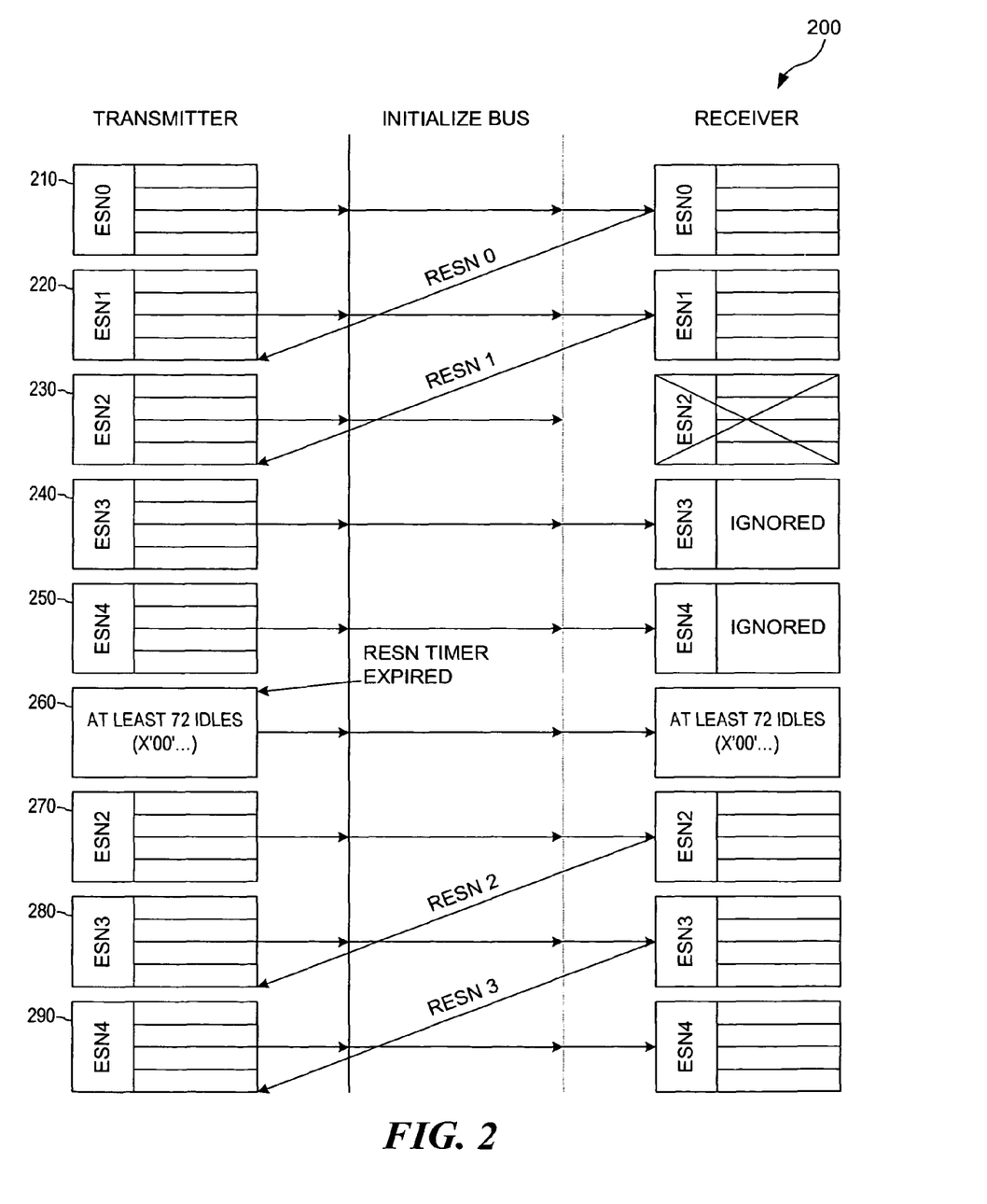
FIG. 2 illustrates a flow diagram of envelopes from a transmitter to a receiver.

Turning now to FIG. 2, the reference numeral 200 generally indicates is a flow diagram from transceiver A 110 ("transmitter") to transceiver B 120 ("receiver"). In flow 210, an envelope of ESN 0 is sent to the receiver. Also, the timer to receive a RESN is set by the transmitter. The ESN packet is received by the receiver and a RESN of 0 is sent back to the transmitter. However, the transmission takes a discrete amount of time. Meanwhile, the transmitter transmits an envelope of ESN 1 in flow 220 to the receiver. Then, between flow 220 and 230, the RESN for ESN 0 is received, so the timer is restarted for ESN 1. In flow 230, the transmitter sends an envelope 2. However, this is not received at the receiver. Between flow 230 and 240, the RESN for envelope 1 is received, so the timer is again restarted.

In flow 240, the transmitter sends envelope of ESN 3. However, this is ignored, as the ESN number of the last good envelope received, ESN 1, is not sequential to the next good packet received, which is ESN 3. Therefore, the receiver ignores the ESN 3 packet, whether or not it is corrupted as determined according to the CRC check. Similarly, in flow 250, the transmitter continues to send for the ESN 4.

However, after flow 250 the RESN timer for ESN 2 expires. Once the timer expires, the transmitter idles 260 until the various buffers are flushed. In the system 100, this is 72 idles. If a transmission error occurred because the receiver did not correctly detect the start of an envelope (due to an error on the Envelope Start Indicators), then the receiver may be out of sync with the envelope boundaries. The 72 idles will cause the receiver to flush through any malformed envelopes to ensure it is outside of an envelope boundary when the retried envelope arrives at the receiver.

Then, in flow 270, the transmitter re-sends another data envelope 2 to the receiver. The receiver then sends an acknowledgment. In data flow 280, the transmitter sends an envelope 3 to the receiver, which is acknowledged. Meanwhile, after flow 280, the acknowledgment RESN for 2 is received by the transmitter. Therefore, ESN 2 is taken out of the send buffer 115. In flow 290, ESN 4 is sent by the transmitter to the receiver. Meanwhile, the RESN 3 is received by the transmitter, so therefore ESN 3 is deleted from the send buffer 115.

Figure 3A:
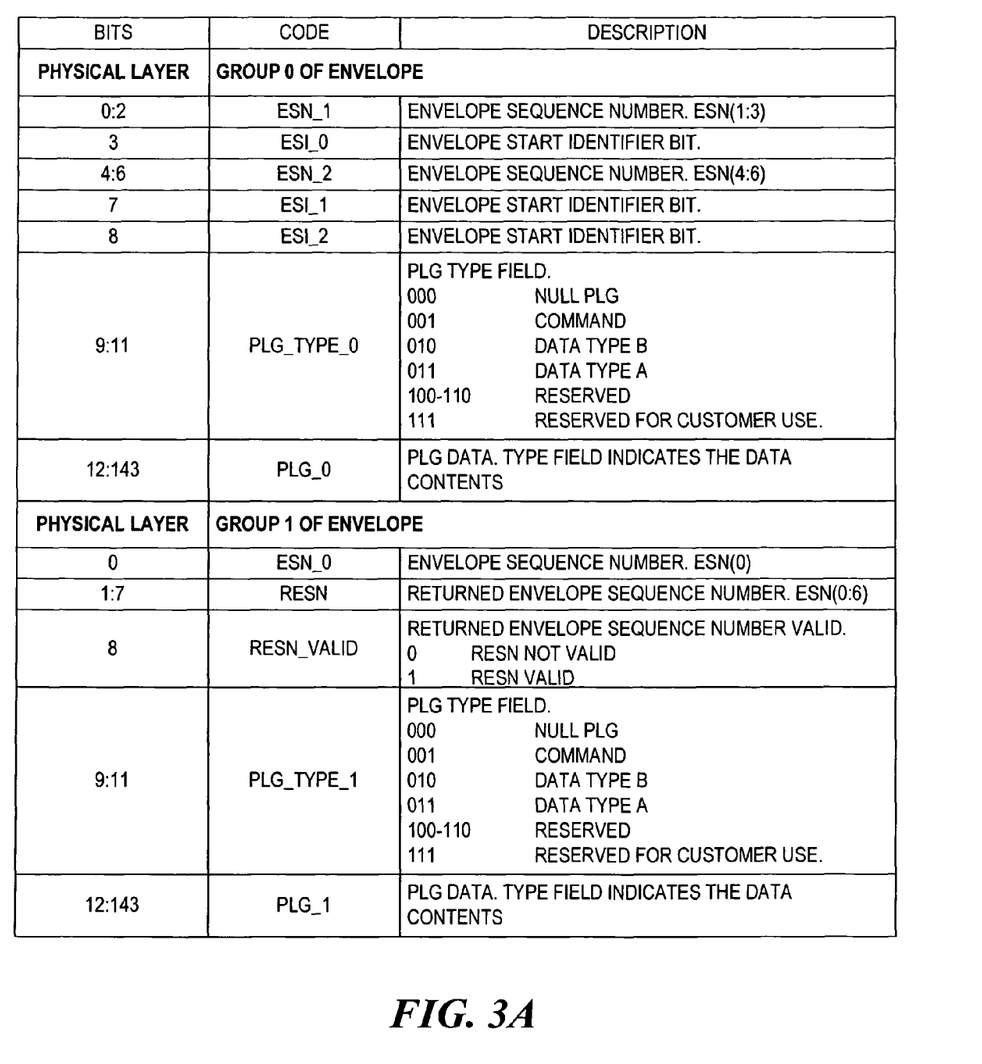
FIGS. 3A and 3B illustrate the bit sequence of a the physical layer groups of an envelope.
Figure 3B:
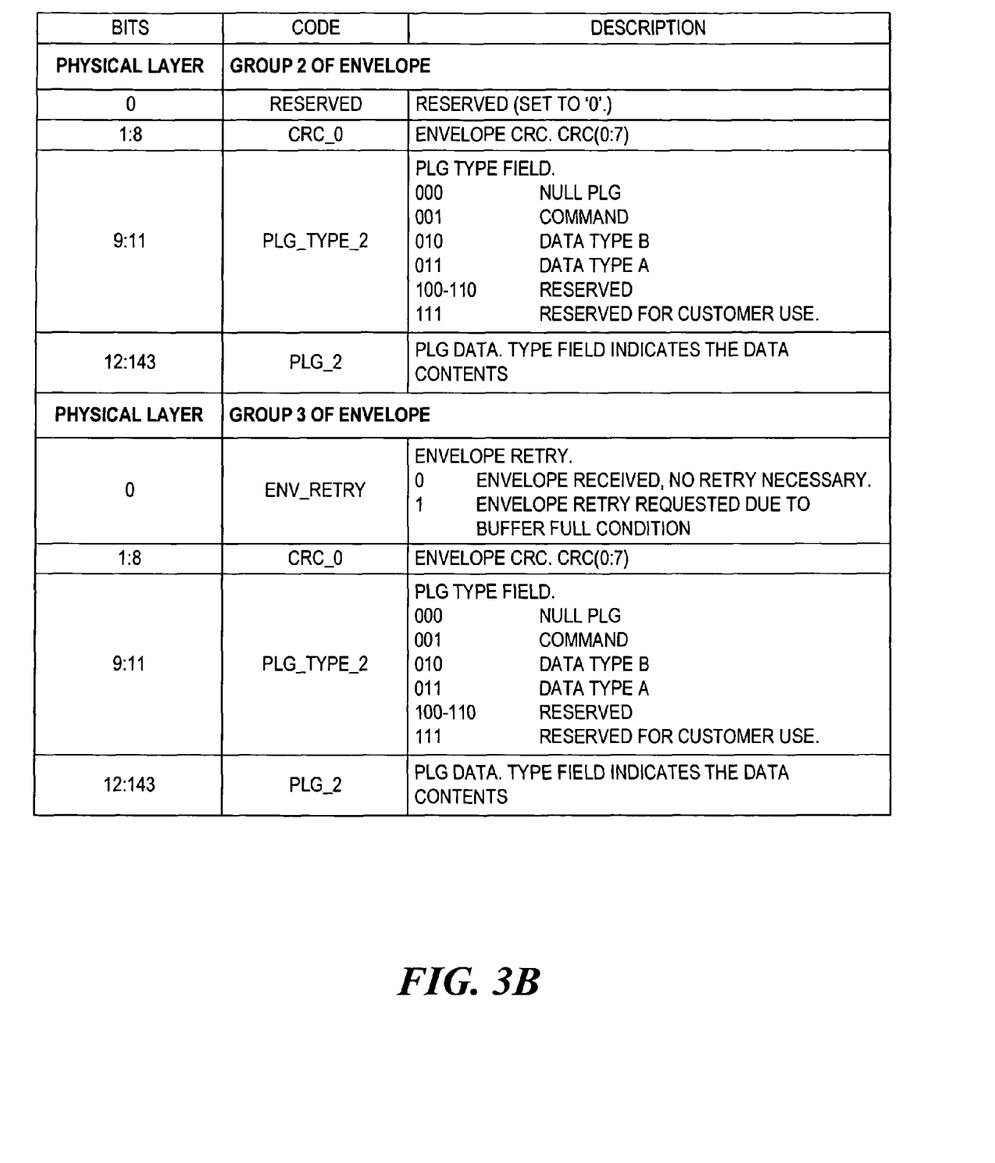

Turning now to FIG. 3A-FIG. 3B, illustrated is one embodiment of an information envelope. The envelope has four different physical layer groups (PLGs). The PLGs have various components. For instance, in the first PLG,(PLG Group 0) there are bits 0:2 and 4:6, which identify the lower 6-bits of the 7-bit ESN for this envelope. (Big Endian notation, bit 0 is the most significant bit)

In PLG Group 0, in bits 9-11, the PLG Type is denoted. The types can be a null PLG, a command PLG, a data type A, a data type B or reserved. In bits 12-143 is the actual data contents of the envelope.

Bits 3 and 7-8 are start bits used for determining the start of an envelope. Three separate bits (on different bit lanes in this embodiment) are used to allow the detection of an envelope even in the event of a single bit error occurring. A receiver detects the start of an envelope when two of the three start bits are one.

In some embodiments, the envelope can be transmitted across the link in a different format than described in FIGS. 3A-3B (that is, 4 cycles×18 bytes, 8 cycles×9 bytes, 12 cycles×6 bytes, etc.) When doing so, errors in the transmission of the data (that is, lost data) can cause the transmitter and receiver to become out of sync. In this case, the start bits are used to resynchronize the transmitter and receiver.

In PLG group 1 of the envelope, the most significant bit of the ESN is provided. Bits 1-7 of PLG 1 contain the RESN number. This is the same RESN number that was discussed in FIG. 2. Bit 8 is a RESN_valid field. If the RESN valid field is not set, the receiver should ignore the RESN value in bits 1-7 of PLG 1.

During initialization of the link, the transmitter may have to transmit an envelope before ever having received an envelope. In this case, there is no 'last good ESN' so the transmitter will transmit an envelope with only an ESN and the RESN valid be inactive. In PLG group 2 (FIG. 3B), bits 1-8 carry the upper 8-bits of the CRC code for this envelope.

In PLG 3 (FIG. 3B), bits 1-8, which carry the lower 8-bits of the CRC code for this envelope. PLG 3 also has the ENV_Retry bit at bit 0.

Figure 4:
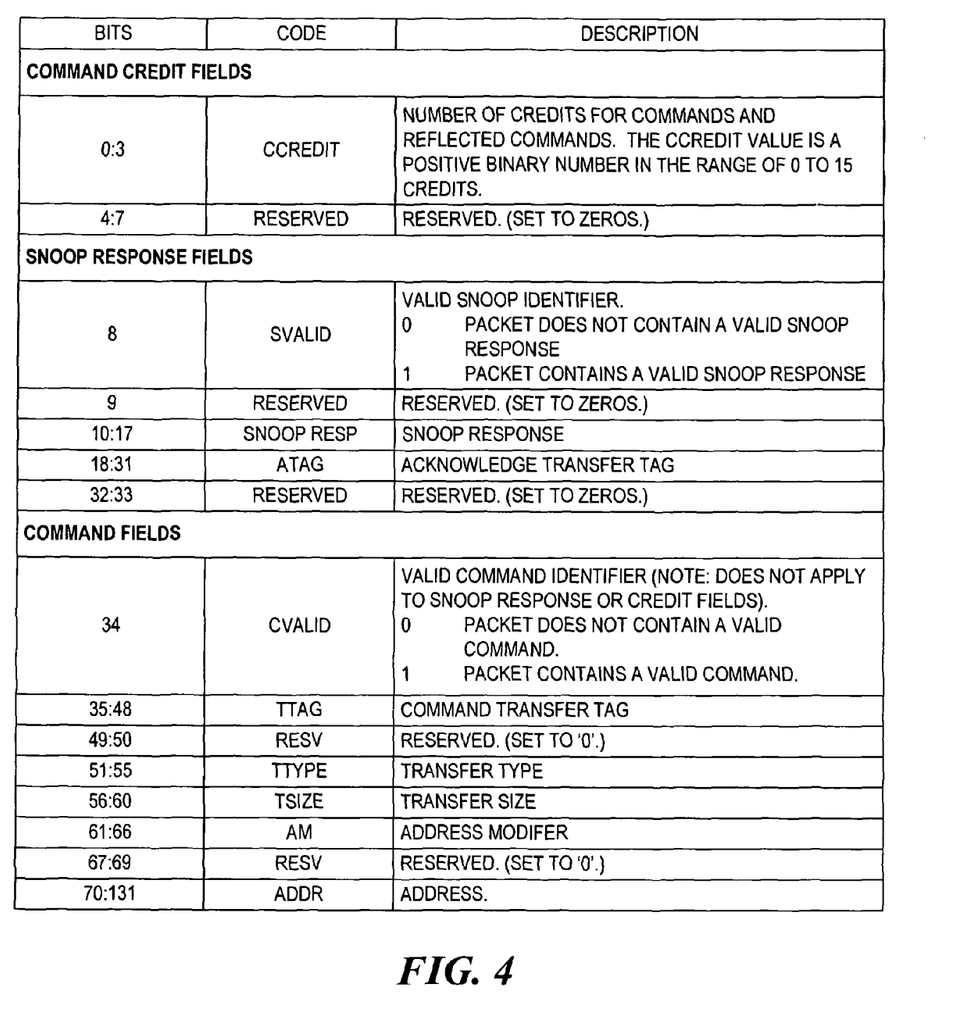
FIG. 4 illustrates one form of a PLG command in a synchronous system.

Turning now to FIG. 4, illustrated is one embodiment of one form of a PLG command. This is one example of data that can be used within the data area of PLG 0, PLG 1, PLG 2 and so on, that is from 12:143 bits of each group. However, those of skill in the art understand that other command formats are within the scope of the present invention.

This command relates to a command used in a synchronous multiprocessing environment, hence the snoop identifier, snoop response, an transfer information indication. However, there is another value of interest. This is the "Ccredit" values for bits 0:3 within the PLG data.

Credit, such as denoted by "Ccredit" or Command credits, can be generally defined as the additional number of commands a transmitter is allowed to send. Separate command and data credits are typically employed. A transmitter keeps a local count of the number of commands (and/or data) supported by the receiver. The local count is decremented when a command (and/or data) is transmitted and incremented when an envelope is received which contains additional credits. The local count of command and/or data supported by the receive can either be initialized at Power On Reset (POR) or sent as credits by the receiver. In either case, the local count is usually less than or equal to the number of commands and/or data the receiver is capable of receiving. For best performance, the receiver must support enough command and data credits to allow the transmitter to send back to back command and/or data packets. The number of credits is a function of the bandwidth and the latency of the link. As the bandwidth and the latency of the link increases, so does the amount of buffering in the receiver. In most cases, a large portion of the receiver's buffer will remain empty. By using the Envelope Retry bit, a receiver can indicate more command and/or data are supported than available buffering. This is referred to as Speculative Credits. In this case the local credit counter in the transmitter may be greater than the number of commands and/or data supported by the receiver.

Figure 5A:
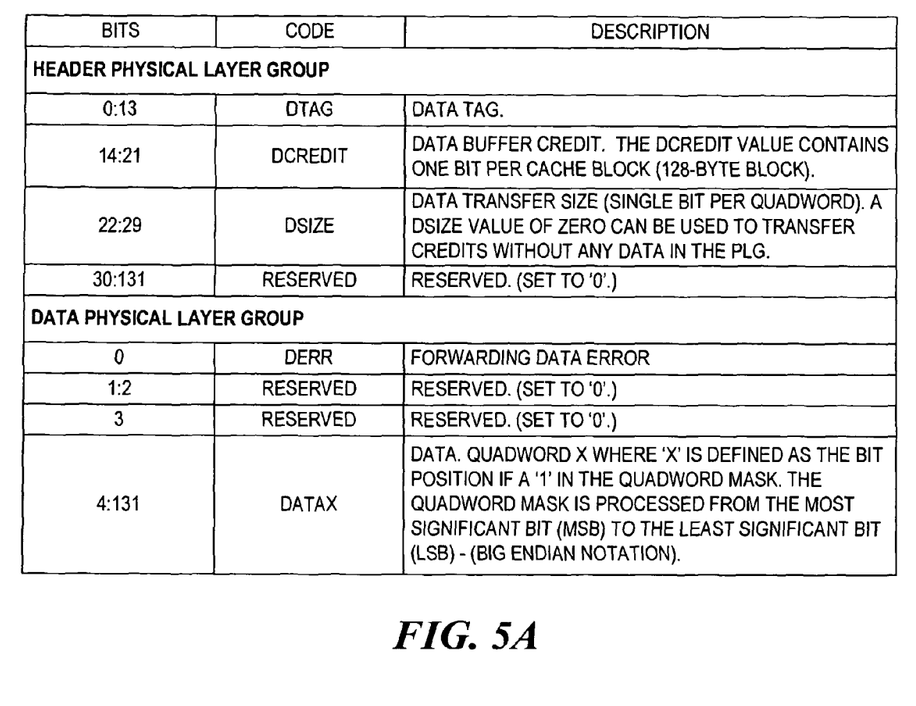
FIG. 5A illustrates one form of a an "A" type data group.

Turning now to FIG. 5A, illustrated is a type A data PLG. The type A data has two parts; a single header and n data PLGs. The header defines the data transfer, such as size, tag, and so on. The header contains the Dtag, Dcredit, and Dsize for the type A data transfer. The next n PLGs contain the data for the transfer along with an error indicator. The number of transfer (or n) is defined by the Dsize field in the header. Multiple envelopes may be required to transfer the full type A data packet. The Dcredit field contains the additional number of data packets which can now be received. The Dcredit is similar to the Ccredit defined in the previous paragraph.

Figure 5B:
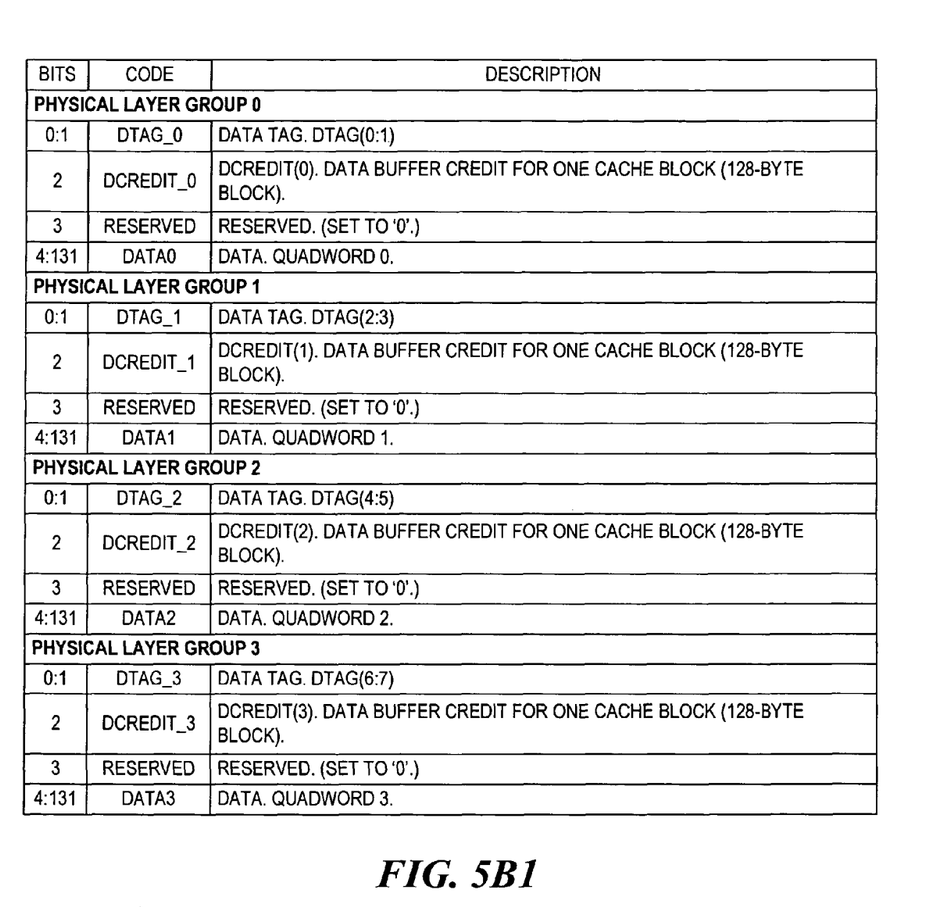
Figure 5B:
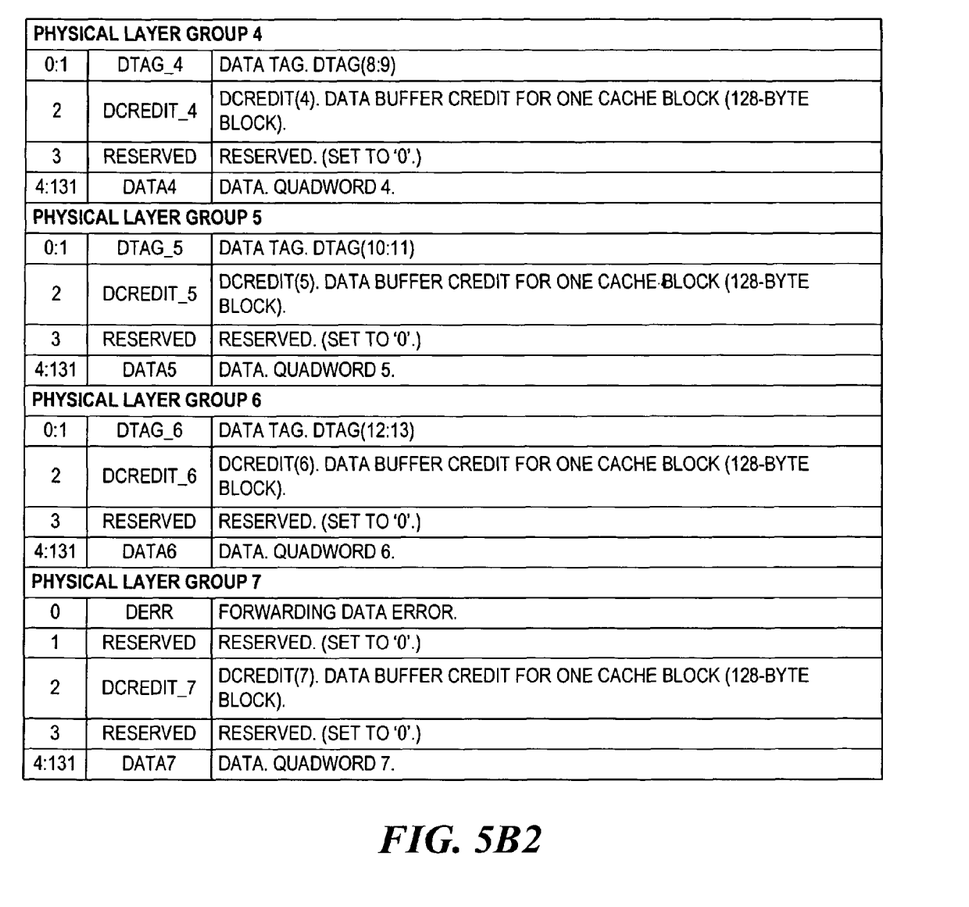

Turning now to FIG. 5B1 and FIG. 5B2, illustrated is a type B data PLG. In one embodiment, the type B data packet is similar to the type A data except that the size is fixed at eight data PLGs and the header information is distributed between the PLGs. A minimum of 2 envelopes is required to transfer a type B data packet. Three envelopes are required if the packet does not start in the first PLG of an envelope. In a further embodiment, a Type B data transfer could actually require up to eight envelopes since there is no restriction that the eight PLGs be sent sequentially. Command or other non-data PLGs may be interleaved within the data PLGs. The only restriction is that once a data transfer begins, another data transfer may not begin until all PLGs of the previous data transfer have been sent.

Figure 6A:
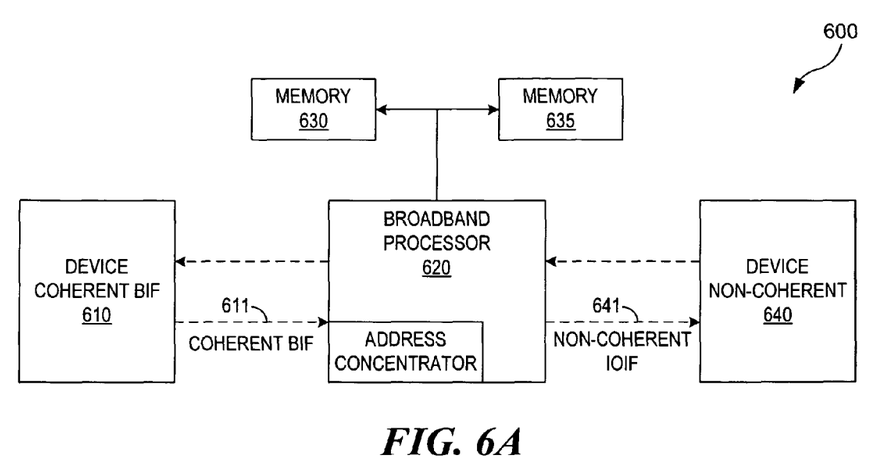
FIG. 6A illustrates a first environment for employment with envelopes.

Turning now to FIG. 6A, illustrated is one environment 600 in which the information envelopes can be used. FIG. 6A illustrates a processor 620 coupled to a coherent device 610 and a non-coherent device 640. The broadband processor 620 has a memory 630 and 635. The links coupling processor 620 to devices 610 and 640 utilize the envelope structure put forth in this application. The link 611 employs a coherent embodiment for the command and data transfers while link 641 employs a non-coherent embodiment for the command and data transfers.

Figure 6B:
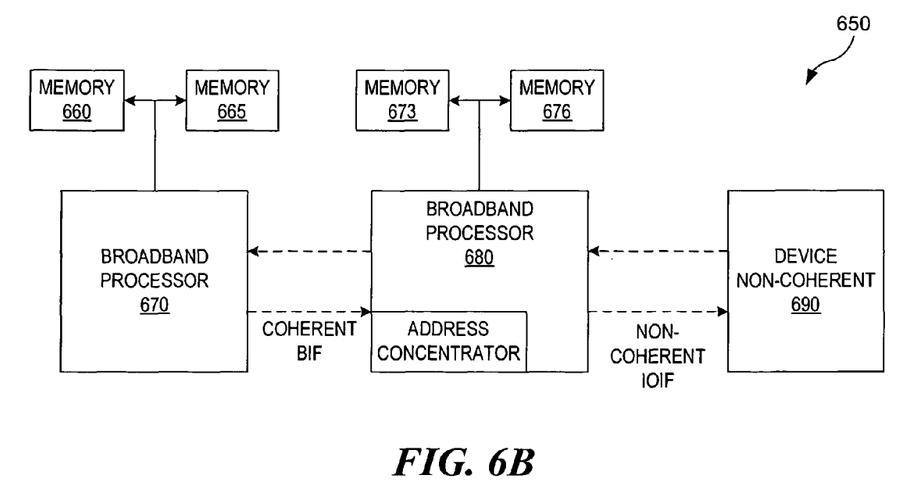
FIG. 6B illustrates a second environment for employment with envelopes.

Turning now to FIG. 6B, however, illustrated is another environment 650 in which the information envelopes can be used. FIG. 6B illustrates a broadband processor 680 coherently coupled to another broadband processor 670. The broadband processor 670 has a memory 660 and 665, and the broadband processor 680 has a memory 673 and 676. The broadband processor 680 is coupled to a non-coherent device 690. These are two separate environments in which the present invention can be practiced.

Figure 7:
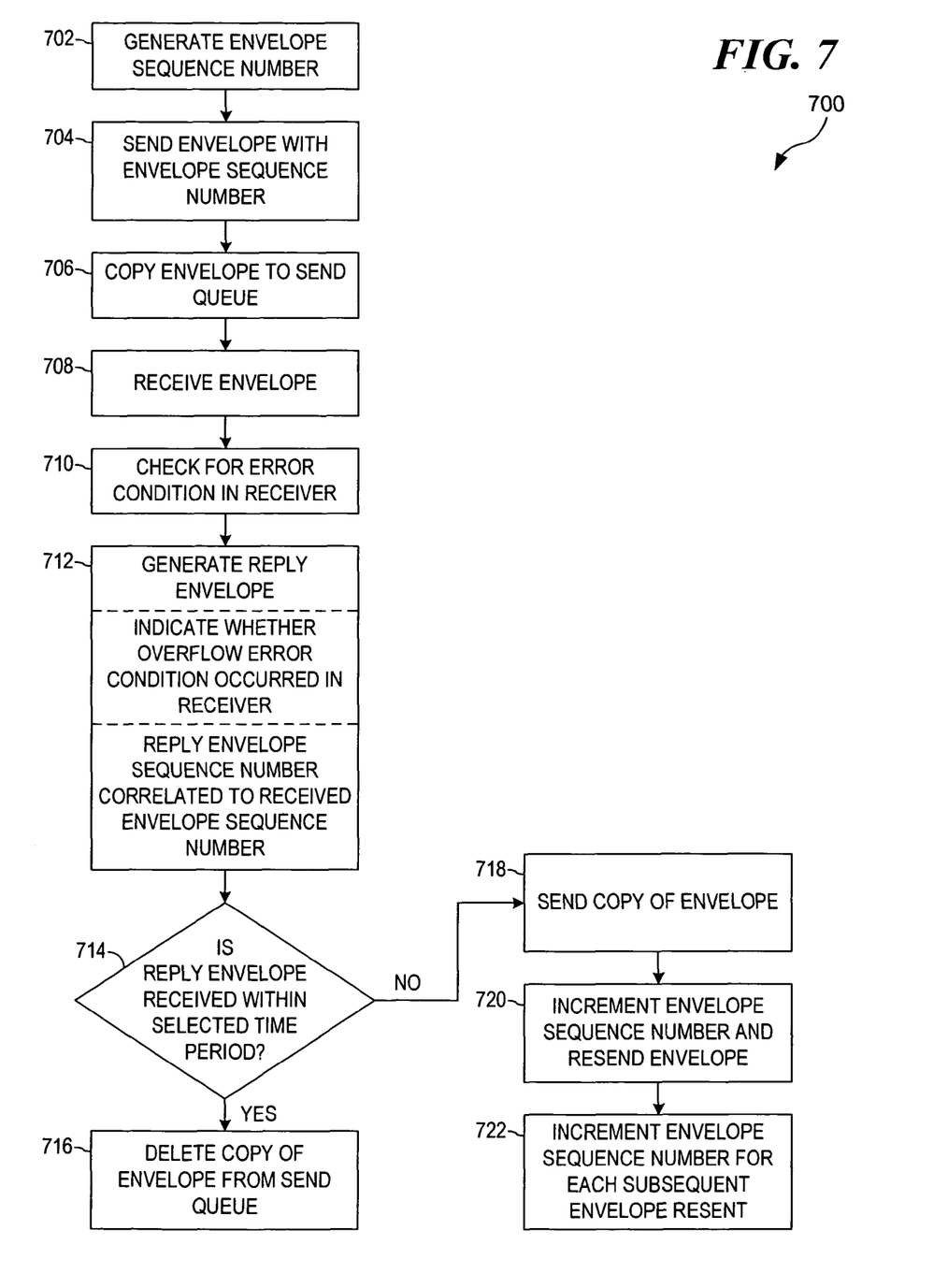
FIG. 7 illustrates a method for sending envelopes.

Turning now to FIG. 7, the reference numeral 700 generally indicates a method for sending envelopes. In step 702, an envelope sequence number is generated. In step 704, an envelope is sent with the envelope sequence number. In step 706, a copy of the envelope is placed in a send queue. In step 708, the envelope is received. In step 710, the receiver determines whether an error condition has occurred. In step 712, a reply envelope is generated. The reply envelope generated in step 712 indicates whether an error condition occurred in the receiver, and further contains a reply envelope sequence number that is correlated to the received envelope sequence number.

In step 714, a determination is made as to whether the reply envelope is received within a selected time period. If the reply envelope has been received within the selected time period, then in step 716, the copy of the envelope is deleted from the send queue. If the reply envelope is not received within the selected time period, then in step 718, the copy of the envelope is sent. The method could continue in step 720, by incrementing the envelope sequence number and resending an envelope. The method may continue in step 722, by incrementing the envelope sequence number for each envelope sent.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure end, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A method for sending envelopes, comprising:

generating a given envelope, wherein the given envelope has a given envelope sequence number that is after a last valid reply envelope sequence number;

sending the given envelope to a receiver;

copying the given envelope to a retry buffer;

sending at least one subsequent envelope to the receiver, wherein each of the at least one subsequent envelope has a sequentially increasing envelope sequence number;

copying the at least one subsequent envelope to the retry buffer;

receiving a reply envelope from the receiver, wherein the reply envelope has a current reply envelope sequence number, wherein the current reply envelope sequence number corresponds to a last envelope successfully and sequentially received at the receiver, wherein the current reply envelope sequence number is after the last valid reply envelope sequence number, wherein the given envelope sequence number is between the last valid reply envelope sequence number and the current reply envelope sequence number, wherein the reply envelope comprises one or more physical layer groups, wherein each of the one or more physical layer groups is a distinct information packet meeting certain predefined criteria, and wherein a given physical layer group within the one or more physical layer groups comprises a credit value;

incrementing a local credit count based on the credit value; and responsive to the reply envelope being received before expiration of a retry envelope sequence number timer and a reply envelope sequence number valid bit for the reply envelope being set and the current reply envelope sequence number being sequentially later than the last valid reply envelope sequence number, deleting each envelope having an envelope sequence number up to and including the current reply envelope sequence number, including the given envelope, from the retry buffer wherein the credit value allocates speculative credits such that responsive to incrementing the local credit count, the local credit count is greater than a number of commands or data packets supported by the receiver.

2. The method of claim 1, wherein the given envelope comprises one or more physical layer groups, wherein each of the one or more physical layer groups is a distinct information packet meeting certain predefined criteria.

3. The method of claim 1, further comprising:

responsive to sending the given envelope to the receiver, decrementing the local credit count.

4. The method of claim 1, wherein credit value comprises a command credit value or a data credit value.

5. The method of claim 1, further comprising:

responsive to the given envelope not being received by the receiver within a selected time period, sending the copy of the given envelope to the receiver.

6. The method of claim 1, further comprising:

responsive to at least one copy of an envelope remaining in the retry buffer, restarting the retry envelope sequence number timer.

7. An apparatus, comprising:

a processor; and a memory coupled to the processor, wherein the memory comprises instructions which, when executed by the processor, cause the processor to:

generate a given envelope, wherein the given envelope has a given envelope sequence number that is after a last valid reply envelope sequence number;

send the given envelope to a receiver;

copy the given envelope to a retry buffer;

send at least one subsequent envelope to the receiver, wherein each of the at least one subsequent envelope has a sequentially increasing envelope sequence number;

copy the at least one subsequent envelope to the retry buffer;

receive a reply envelope from the receiver, wherein the reply envelope has a current reply envelope sequence number, wherein the current reply envelope sequence number corresponds to a last envelope successfully and sequentially received at the receiver, wherein the current reply envelope sequence number is after the last valid reply envelope sequence number, wherein the given envelope sequence number is between the last valid reply envelope sequence number and the current reply envelope sequence number, wherein the reply envelope comprises one or more physical layer groups, wherein each of the one or more physical layer groups is a distinct information packet meeting certain predefined criteria, and wherein a given physical layer group within the one or more physical layer groups comprises a credit value;

increment a local credit count based on the credit value; and responsive to the reply envelope being received before expiration of a retry envelope sequence number timer and a reply envelope sequence number valid bit for the reply envelope being set and the current reply envelope sequence number being sequentially later than the last valid reply envelope sequence number, delete each envelope having an envelope sequence number up to and including the current reply envelope sequence number, including the given envelope, from the retry buffer, wherein the credit value allocates speculative credits such that responsive to incrementing the local credit count, the local credit count is greater than a number of commands or data packets supported by the receiver.

8. The apparatus of claim 7, wherein the given envelope comprises one or more physical layer groups, wherein each of the one or more physical layer groups is a distinct information packet meeting certain predefined criteria.

9. The apparatus of claim 7, wherein the instructions further cause the processor to:

responsive to sending the given envelope to the receiver, decrement the local credit count.

10. The apparatus of claim 7, wherein credit value comprises a command credit value or a data credit value.

11. The apparatus of claim 7, wherein the instructions further cause the processor to:

responsive to the given envelope not being received by the receiver within a selected time period, send the copy of the given envelope to the receiver.

12. The apparatus of claim 7, wherein the instructions further cause the processor to:

responsive to at least one copy of an envelope remaining in the retry buffer, restart the retry envelope sequence number timer.

13. The apparatus of claim 7, wherein the receiver is configured to send a reply envelope denoting a receive buffer overflow condition.

* * * * *